(12) United States Patent  
Niles et al.

(10) Patent No.: US 8,725,572 B1
(45) Date of Patent: May 13, 2014

(54) ELECTRONIC ADVERTISING ARBITRAGE (75) Inventors: Ian Harcourt Niles, Irvine, CA (US); Heath B. Clarke, Corona del Mar, CA (US)

(73) Assignee: Local Corporation, Irvine, CA (US)

(*) Notice: Subject to any disclaimer, the term of this patent is extended or adjusted under 35 U.S.C. 154(b) by 1520 days.

(21) Appl. No.: 11/452,607

(22) Filed: Jun. 13, 2006

(51) Int. Cl.
*G06Q 30/00* (2012.01)
*G06Q 30/02* (2012.01)

(52) U.S. Cl.
CPC ........ *G06Q 30/0273* (2013.01); *G06Q 30/0251* (2013.01)
USPC ..................... 705/14.69; 705/14.49

(58) Field of Classification Search
USPC .................. 705/1–28, 14.49, 14.69
See application file for complete search history.

(56) References Cited

U.S. PATENT DOCUMENTS

| 4,948,145 A * | 8/1990 | Breslow ........................ 273/256 |
| 6,990,633 B1 * | 1/2006 | Miyasaka et al. ............. 715/201 |
| 2005/0097024 A1 * | 5/2005 | Rainey ............................. 705/37 |
| 2005/0137939 A1 * | 6/2005 | Calabria et al. ................. 705/26 |

OTHER PUBLICATIONS

Jing et al. "An Association Thesaurus for Information Retrieval." pp. 1-15. Dept. of Computer Science, U. of Massachusetts at Amherst, MA., 1994.
Schutze et al. "A Cooccurrence-Based Thesaurus and Two Applications to Information Retrieval." Information Processing & Management, 1997, pp. 307-318. vol. 33, No. 3. Elsevier Science Ltd. Printed in Great Britain.

* cited by examiner

*Primary Examiner* — Victoria Vanderhorst
*Assistant Examiner* — Scott C Anderson
(74) *Attorney, Agent, or Firm* — Burns & Levinson LLP; Bruce D. Jobse, Esq.

(57) ABSTRACT

Performing an operation is disclosed. A first keyword is received. For the first keyword an associated semantic group of one or more keywords associated by a semantic relationship is identified. An electronic advertising operation is performed using a second keyword associated with the identified semantic group.

18 Claims, 9 Drawing Sheets

ELECTRONIC ADVERTISING ARBITRAGE

BACKGROUND OF THE INVENTION

Search Engine Marketing (SEM) includes placing a bid on one or more keywords of a search engine to display a hyperlinked advertisement, e.g., to a user of the search engine who submits a query including one of the keywords, when the bid is sufficiently high. Manually managing these keywords can be difficult since advertisers often bid and manage hundreds to thousands of keywords. Automation of SEM management has traditionally included use of mathematical/financial models that determine which individual keywords will maximize click traffic and/or profit margin. Since more than one keyword can represent the same meaning (synonymy) and more than one meaning can be represented by the same keyword (ambiguity), the traditional individual keyword management solution is less than optimal. Therefore, there exists a need for a better to manage keywords for advertisements.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Managing an electronic advertising campaign is disclosed. In some embodiments, one or more keywords are grouped into one or more semantic groups. The keywords of a semantic group are associated by a semantic relationship. For example, keywords are grouped on the basis of a same, similar or related meaning. Keywords of the semantic group may be related morphologically (e.g., stemmed), lexically (e.g., related within a network of broader, narrower, and/or similar expressions of meaning), syntactically, and/or otherwise. In some embodiments, the semantic groups are used to manage an electronic advertising campaign. In some embodiments, a semantic group is associated with a specific product and/or service. In some embodiments, a semantic group is associated with a location. For example, zip code(s), area code(s), and/or location identifier(s) associated with a single location are included in a single semantic group. In some embodiments, by semantically grouping keywords, an advertising campaign can be managed by groups of keywords rather by individual keywords. In some embodiments, one or more values (e.g., advertising cost) of keywords within a semantic group are identified to perform arbitrage of keyword advertisements. In some embodiments, electronic advertising includes one or more of the following: search engine advertising, keyword bid advertising, wireless message advertising, directory listing advertising, pay per impression adverting, pay per click advertising, and other forms of advertising on an electronic medium.

Figure 1:
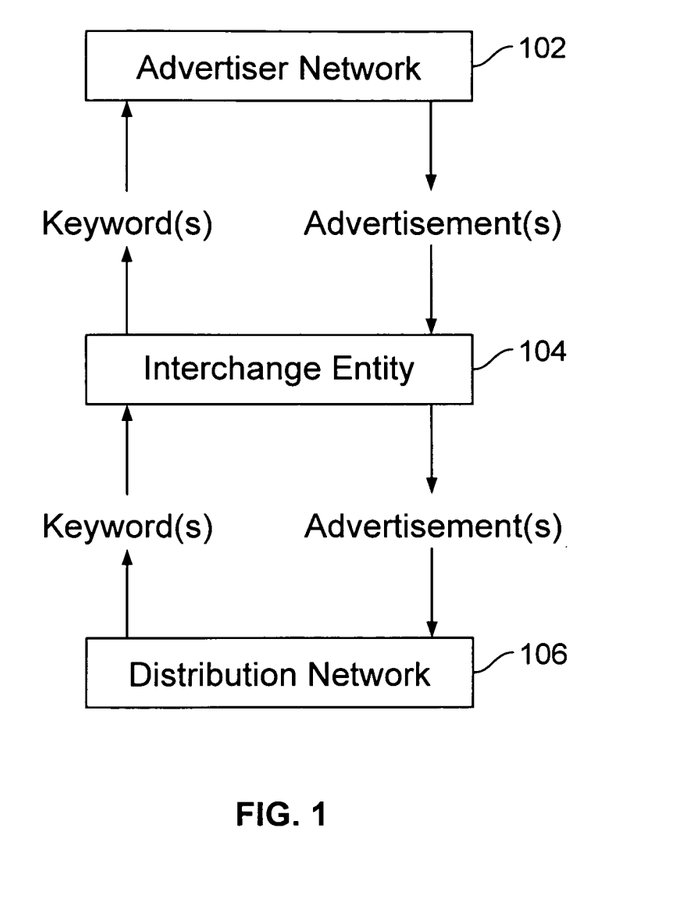
FIG. 1 is a block diagram illustrating an embodiment of an electronic advertising environment.

FIG. 1 is a block diagram illustrating an embodiment of an electronic advertising environment. Advertiser network 102 includes one or more entities associated with providing electronic advertisements. For example, an advertiser submits to an entity of advertiser network 102 a request to advertise. The request to advertise may be in the form a bid for a keyword associated with a hyperlinked advertisement intended to be displayed, for example, when a computer user and/or other potential advertisement audience requests data associated with the keyword. Distribution network 106 includes one or more entities associated with displaying electronic advertisements. For example, distribution network 106 includes a search engine entity that displays electronic advertisements in response to search queries. In various embodiments, the electronic advertisement includes one or more of the following: a text, an image, a listing, a wireless text message, a hyperlinked text/image, a banner advertisement, a pop-up advertisement, and a placement and/or an ordering of information. Interchange entity 104 in this example provides one or more advertisements displayed by distribution network 106, e.g., in response to keywords received from the distribution network 106. In some embodiments, at least a portion of the one or more advertisements provided to distribution network 106 is received from advertiser network 102. A keyword received from distribution network 106 is passed by interchange entity 104 to the advertiser network 102. Advertiser network 102 provides to interchange entity 104 one or more advertisements responsive to the keyword, and interchange entity 104 provides at least a selected received advertisement to distribution network 106. In some embodiments, a keyword is associated with one or more characters that can be used to specify desired information. For example, a keyword is used specify an advertisement potentially of interests to a user.

In some embodiments, by serving as an intermediary between advertiser network 102 and distribution network 106, interchange entity 104 is credited at least a portion of an advertising fee associated with an advertisement. For example, an advertiser bid price for a referral (e.g. click-through) and/or a display (e.g., impression) of an advertisement is shared. In some embodiments, an entity of distribution network 106 is credited at least a portion of the advertising bid amount for displaying/referring the keyword advertisement. In some embodiments, referral of the advertisement includes providing an advertisement to a user that the user uses to perform an operation including one or more of the following: a selection of a hyperlink, a purchase of a product and/or service, an initiation of a telephonic communication, and provide information.

In some embodiments, the interchange entity serves as a member of the advertiser network and/or as a member of the distribution network. For example, an advertiser submits advertisements directly the interchange entity and/or the interchange entity displays advertisements directory to a user. In some embodiments, one or more entities of the advertiser network 102 provide advertisements to one or more entities of distribution network 106 without using the interchange entity 104. In some embodiments, an entity of the advertiser network may also be a distribution network entity. For example, a search engine entity directly accepts advertisements from an advertiser and directly displays the accepted advertisement in response to a search query.

Figure 2:
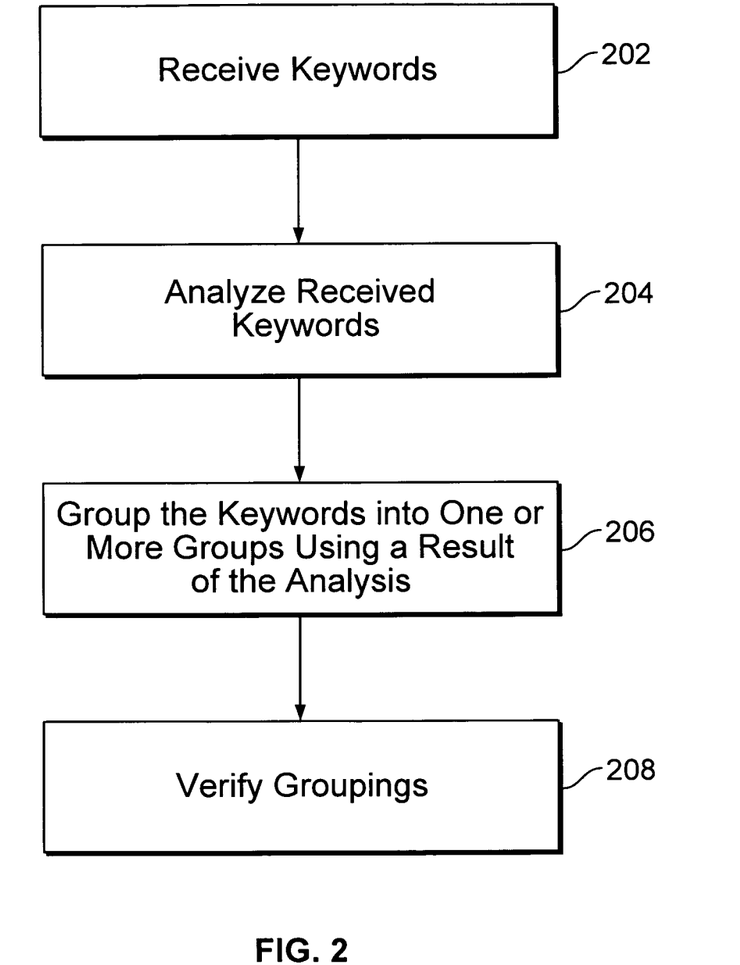
FIG. 2 is a flowchart illustrating an embodiment of a process for grouping keywords into one or more groups.

FIG. 2 is a flowchart illustrating an embodiment of a process for grouping keywords into one or more groups. In some embodiments, the process of FIG. 2 is implemented in an entity of advertiser network 102, interchange entity 104, and/or an entity of distribution network 106 in FIG. 1. At 202, one or more keywords are received. In some embodiments, the keywords are associated with one or more keywords to be categorized, organized, and/or managed. In various embodiments, the keywords are associated with one or more of the following: an electronic campaign of an advertiser (e.g., keywords the advertiser had bid on), one or more electronic advertisement listings from advertiser(s) (e.g., associated keywords of advertisements received by an advertiser network entity), one or more location identifiers, and/or one or more terms relevant to a line of business, a product, and/or a service. At 204, the received keywords are analyzed. In some embodiments, analyzing the keywords includes determining one or more relationships between the received keywords. For example, semantic relationships between the keywords are determined. In some embodiments, a thesaurus of related words is used in analyzing the received keywords. In various embodiments, the thesaurus is generated by performing one or more of the following: determining a first order co-occurrence pattern of content, determining a second order co-occurrence pattern of content, determining related words/phrases that appear in the same or similar lexico-syntactic patterns (e.g. head/modifier relationships), and or a manually constructing at least a portion of the thesaurus. At 206, the received keywords are grouped into one or more groups using a result of the analysis. In some embodiments, grouping the keywords includes associating together keywords having a semantic relationship, e.g., the same, similar, and/or related meaning. In various embodiments, one or more keywords are determined at 206 to have a semantic relationship based on their common association with a geographical location, a line of business, a product, and/or a service. For example, keyword relating to a single product/service can be grouped morphologically (e.g., stemmed/plural/tense/gender variations) and/or grouped lexically (e.g., associated in a broader/narrower/related/similar expressions of meaning). In some embodiments, keyword relating to a geographical location can be grouped on a basis of synonymy relations (e.g., zip codes and area codes that are correlated with a single or adjacent city/neighborhood) and/or a basis of hierarchical relations (e.g., part/whole relations—suburbs around an urban center). In some embodiments, one or more of the groups of keywords are grouped together into a hierarchy of groupings. In some embodiments, the keyword groupings are used to manage the keywords in an electronic advertising campaign. Instead of and/or in addition to bidding on individual keywords, an advertiser identifies semantic groups of keywords relevant to the advertiser's business and submits a bid for the entire group. In some embodiments, an advertiser selects and manages keywords by semantic group, e.g., by product/service, geographic location, etc., but determines bids individually for keywords and/or subgroups of keywords within the group. In some embodiments, advertisers bid on semantic groups of keywords and bids are applied to keywords comprising the group, including to additional keywords added to the group over time. In some embodiments, standards-based or proprietary product/service classifications are used to group keywords. At 208, the groupings are verified. In some embodiments, the verification is performed by at least in part by a human reviewer. In some embodiments, the verification is optional.

Figure 3:
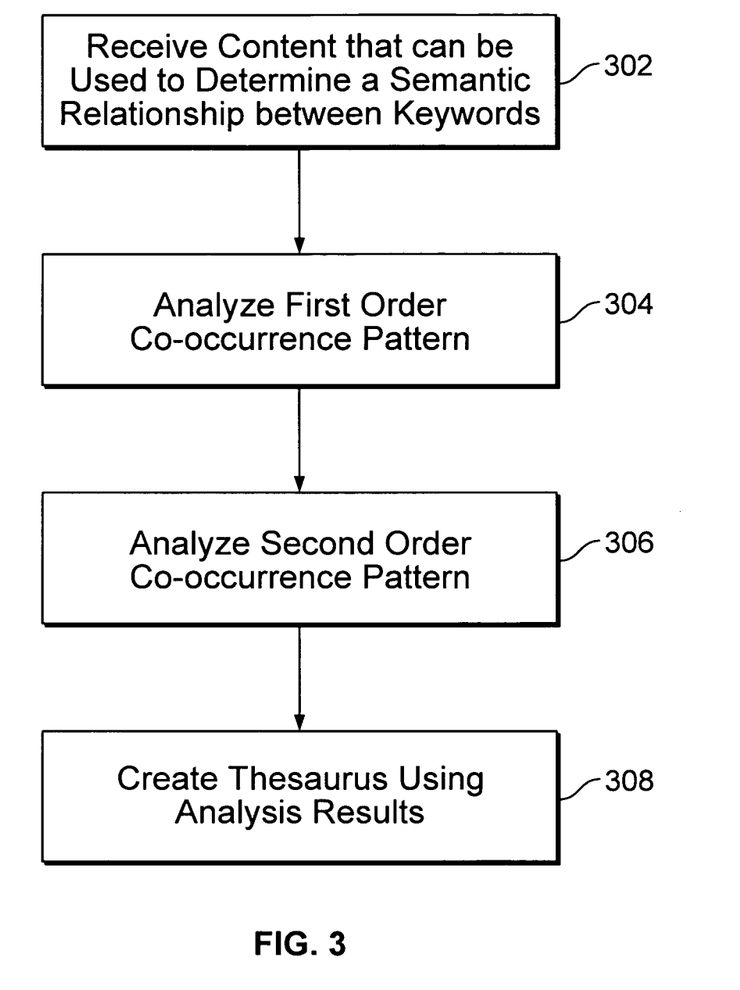
FIG. 3 is a flowchart illustrating an embodiment of a process for analyzing text.

FIG. 3 is a flowchart illustrating an embodiment of a process for analyzing text. In some embodiments, the process of FIG. 3 is included in 204 of FIG. 2. In some embodiments, the process of FIG. 3 generates a thesaurus that can be at least in part used to determine if two keywords are related semantically. At 302, content that can be used to determine a semantic relationship between with keywords is received. The content may include text/characters in one or more of the following formats: a document, a webpage, a log file, one or more database entries, and a format able to encode semantic relationships. In some embodiments, receiving the content includes receiving an identification of the representative content. At 304, a first order co-occurrence pattern of the representative content is analyzed. For example, analyzing the first order co-occurrence pattern includes determining which two of words tend to occur together, and if the two words occur together with a high enough frequency, the two words are determined to have a semantic relationship. In some embodiments, two words determined to have a semantic relationship to one another are associated with each other in a thesaurus. At 306, a second order co-occurrence pattern of the representative content is analyzed. For example, analyzing the second order co-occurrence pattern includes determining which word tends to occur together with which pair of related words, and if the words occur together with a high enough frequency, the words are related together. In some embodiments, the words are related together in a thesaurus. In some embodiments, the first and/or second order co-occurrence pattern analysis is performed at least in part using a statistical formula. In some embodiments, the words of the identified first and/or second order co-occurrence relationship are expanded using word stemming and/or word expansion, and the expanded forms are included in the thesaurus. At 308, a thesaurus is created using the analysis results. In some embodiments, the thesaurus is used to identify if two keywords are related semantically. In some embodiments, creation of the thesaurus is optional. For example, in some embodiments results of the first and second co-occurrence pattern analysis are used without creating the thesaurus to determine semantic relationships between keywords.

Figure 4:
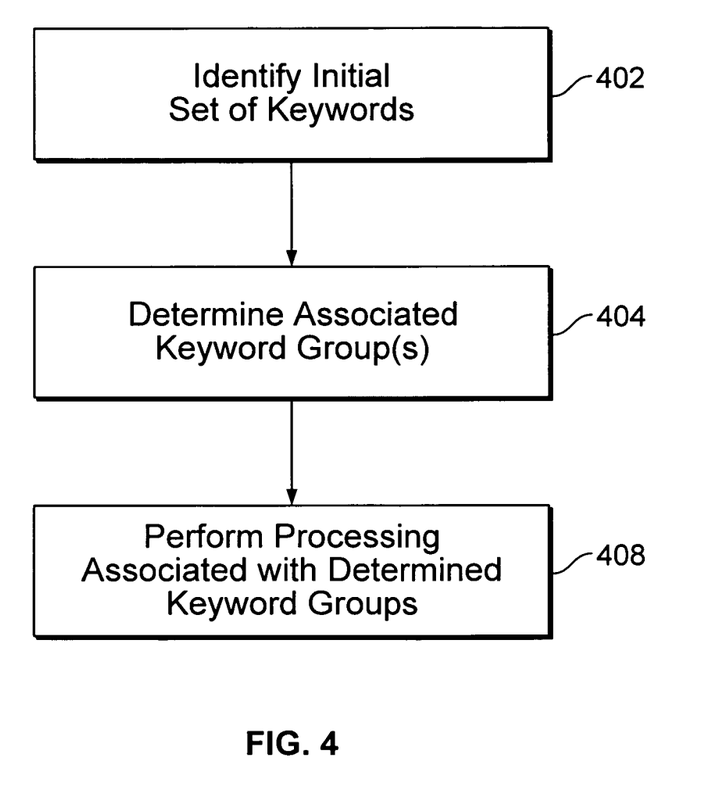
FIG. 4 is a flowchart illustrating an embodiment of a process for performing processing associated with a keyword grouping.

FIG. 4 is a flowchart illustrating an embodiment of a process for performing processing associated with a keyword grouping. At 402, an initial set of keywords are identified. The initial set includes one or more keywords. In some embodiments, the set of keywords includes at least a portion of keywords associated with one or more advertisements of an advertiser. At 404, one or more keyword groups associated with the set of keywords is determined. For each keyword of the set, a corresponding keyword group is determined. Two or more keywords may be associated with the same keyword group. In some embodiments, the keyword group is associated with the keyword group in 206 of FIG. 2. In some embodiments, the keyword groups are associated with one or more of the following: a geographical location, a line of business, a product, and/or a service. In some embodiments, by determining the associated keyword groups, one or more semantic relationships between keywords are determined. At 408, processing associated with the determined keyword groups is performed. In some embodiments, performing the processing includes processing one or more keywords of the initial set of keywords by using information associated with at least one of the determined groups. In various embodiments, the processing associated with the determined keyword groups includes performing one or more of the following: organizing the initial set of keywords into the determined groupings, tracking information associated with one or more of initial set of keyword by tracking the groupings, and manage bidding associated with one or more of the initial set of keyword by using the groupings. In some embodiments, managing the bidding associated with one or more of the initial set of keywords includes adjusting the bid amount associated with a keyword. and/or adjusting the bid amount of all keywords associated with a single keyword group. In some embodiments, performing the processing includes determining one or more additional keywords for an electronic advertising campaign at least in part by using the determined keyword group. For example, a bid for a semantically related keyword not already included in the initial set of keyword is placed with an advertising network entity.

Figure 5:
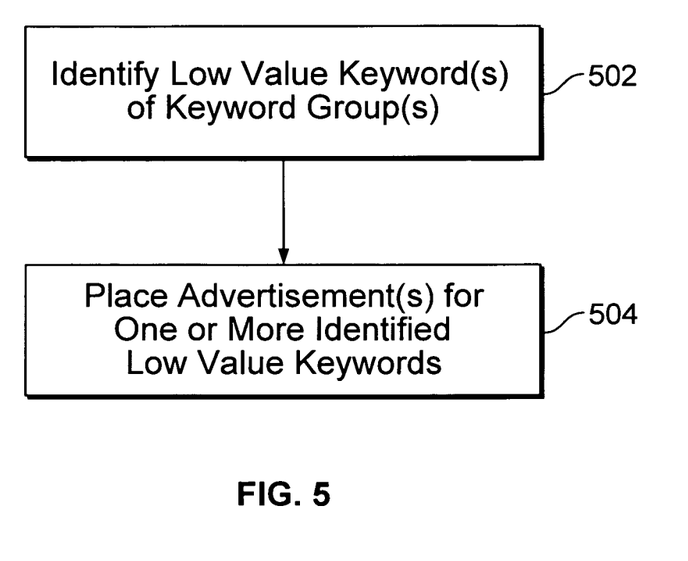
FIG. 5 is a flowchart illustrating an embodiment of a process for identifying and placing associated advertisement for one or more low value keywords of one or more keyword groups.
Figure 6:
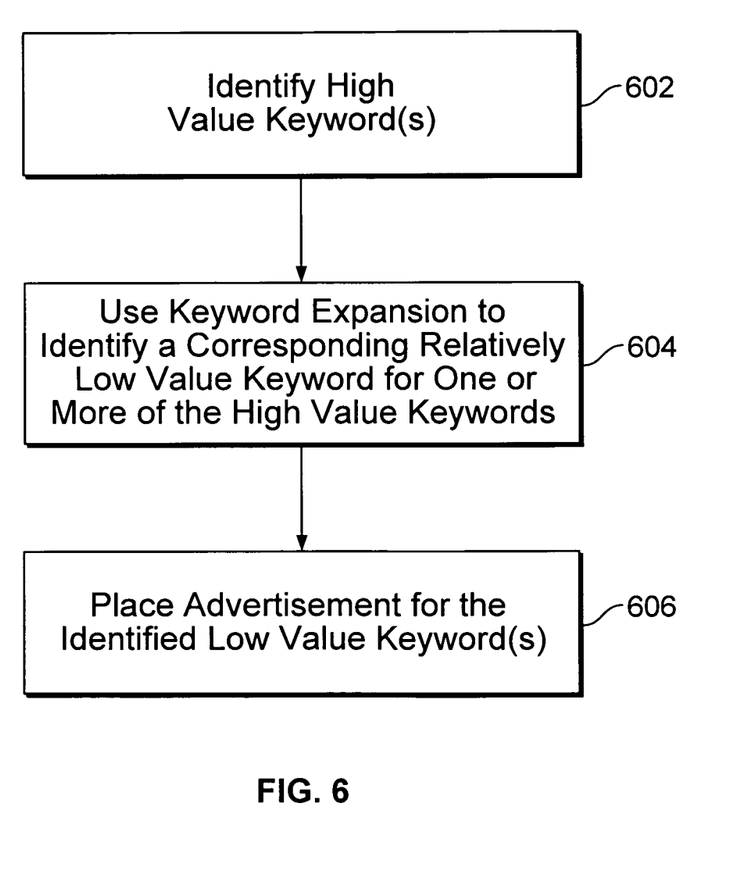
FIG. 6 is a flowchart illustrating an embodiment of a process for identifying and placing an advertisement for one or more low value keywords identified by using keyword expansion.
Figure 7:
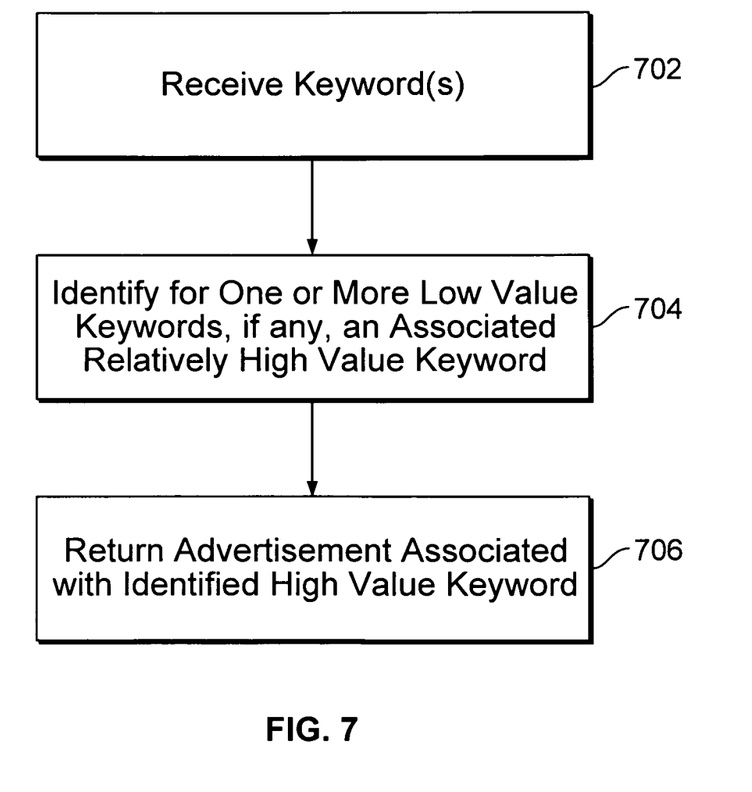
FIG. 7 is a flowchart illustrating an embodiment of a process for returning an advertisement.
Figure 8:
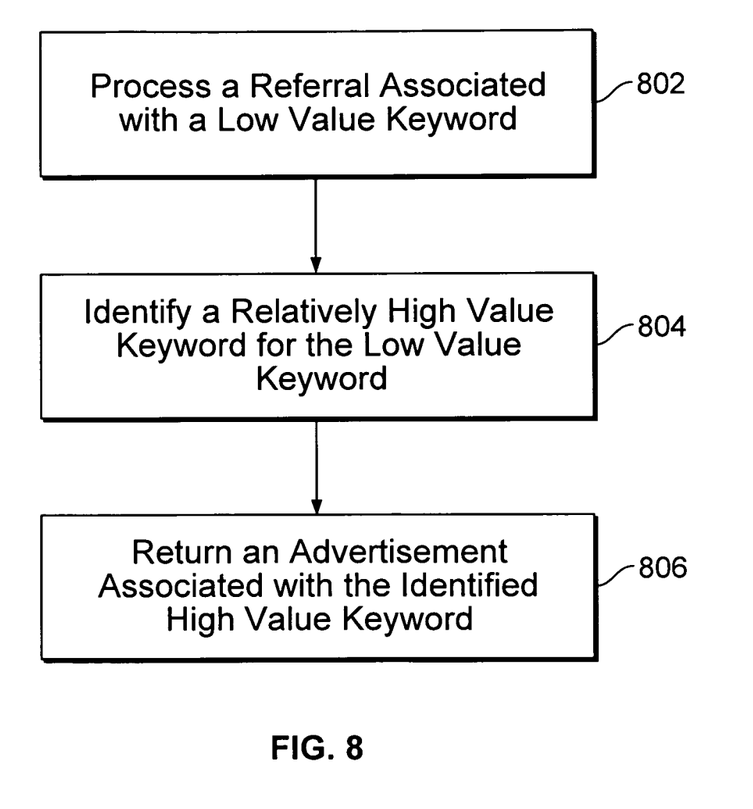
FIG. 8 is a flowchart illustrating an embodiment of a process for returning an advertisement.
Figure 9:
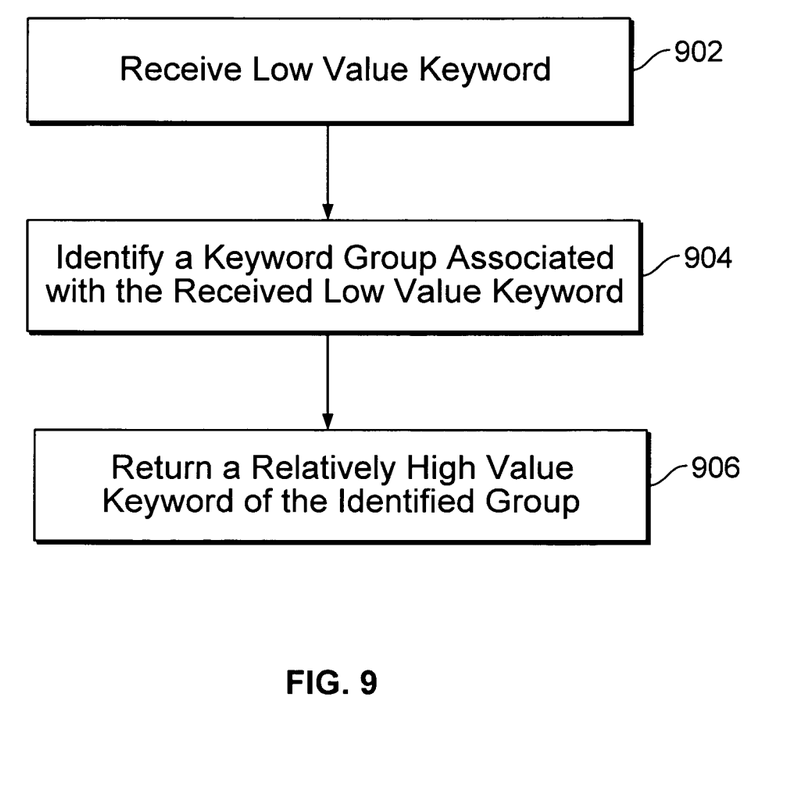
FIG. 9 is flowchart illustrating an embodiment of a process for returning a relatively high value keyword.

In various embodiments, by using semantic groupings of keywords, relative values of keywords within each group can be determined Using the relative values, arbitrage of electronic advertisements can be performed. The arbitrage can be performed by an entity placing an advertisement or an entity providing an advertisement. Examples of placing an advertisement (e.g. submitting a bid amount for a corresponding keyword advertisement to be returned) includes submitting an advertisement to an advertiser network entity by a party whose business is being advertised, listing an advertisement with an interchange entity by an advertiser network entity, listing an advertisement with an distribution network entity by an advertiser network entity, and listing an advertisement with an distribution network entity by an interchange entity. Examples of providing an advertisement includes providing an advertisement to an interchange entity by an advertiser network entity, providing an advertisement to an distribution network entity by an advertiser network entity, providing an advertisement to an distribution network entity by an interchange entity, and providing an advertisement to a user by a distribution network entity. FIGS. 5 and 6 are associated with performing electronic advertisement arbitrage by an entity placing an advertisement. FIGS. 7, 8, and 9 are associated with performing electronic advertisement arbitrage by an entity providing an advertisement.

FIG. 5 is a flowchart illustrating an embodiment of a process for identifying and placing associated advertisement for one or more low value keywords of one or more keyword groups. At 502, one or more low value keywords of one or more keyword groups are identified. In some embodiments, the keyword groups are determined in 206 of FIG. 2. A low value keyword is a keyword associated with a low advertising cost. In some embodiments, a keyword is a low value keyword if a potential advertising cost associated the keyword is less than a predetermined amount and/or if a potential advertising cost of the keyword is less relative to one or more other keywords associated/potentially associated with the associated keyword group. In some embodiments, the advertising cost is a bid amount associated with the keyword. In some embodiments, the keyword groups include one or more keywords that can potentially be used to place an advertisement. In some embodiments, identifying the low value keywords includes determining one or more new low value keywords semantically associated with one or more of the keyword groups. At 504, one or more advertisements associated with one or more of the identified low value keywords are placed. In some embodiments, the advertisements are placed with an entity of an advertising network. In some embodiments, placing the advertisements includes bidding for one or more of the identified low value keywords. In some embodiments, an advertiser (e.g., a party whose business is being advertised) uses the process of FIG. 5 to determine inexpensive advertisement opportunities. In some embodiments, an advertiser uses the process of FIG. 5 to determine inexpensive keywords to buy in order to provide an advertisement associated with a higher value keyword. For example, an advertiser network entity performing arbitrage lists an identified low value keyword with an interchange entity, and when an advertisement associated with the low value keyword is requested by the interchange entity, the advertiser network entity returns an advertisement associated with a higher value keyword. By paying the advertising fee of the low value keyword, the advertiser network entity performing the arbitrage can profit from the advertising fee paid by the advertiser of the relatively higher value keyword.

FIG. 6 is a flowchart illustrating an embodiment of a process for identifying and placing an advertisement for one or more low value keywords identified by using keyword expansion. In some embodiments, the process of FIG. 6 is used to perform keyword advertising arbitrage. In various embodiments, the process of FIG. 6 is implemented in an entity of distribution network 106, interchange entity 104, and/or an entity of advertiser network 102 in FIG. 1. At 602, one or more high value keywords of one or more keyword groups are identified. In some embodiments, the keyword groups are determined in 206 of FIG. 2. A high value keyword is a keyword associated with a high advertising cost. In some embodiments, a keyword is a high value keyword if a potential advertising cost associated with the keyword is higher than a predetermined amount and/or if a potential advertising cost of the keyword is higher relative to one or more other keywords associated/potentially associated with the associated keyword group. In some embodiments, the advertising cost is a bid amount associated with the keyword. In some embodiments, the keyword groups include one or more keywords that can potentially used to place an advertisement. In some embodiments, identifying the high value keywords includes determining one or more new high value keywords semantically associated with one or more of the keyword groups.

At 604, keyword expansion is used to identify a corresponding relatively low value keyword for one or more of the identified high value keywords. In some embodiments, keyword expansion includes deriving a semantically related keyword associated with a lower advertising cost bid value. In some embodiments, keyword expansion is performed at least in part by using semantic information associated with a keyword group. Examples of keyword expansion includes one or more of the following: replacement of one or more words in a keyword with a synonym (e.g., from "lawyer" to "attorney"), addition of an attribute wrapper (e.g., "affordable", "local", "dependable", etc.), replacement of one or more words in a keyword with a common misspelling of a word, and replacement of a geographical location name in a keyword with a zip code, area code, or other location-specific information and/or identifier. Examples of the attribute wrapper include an adjective modifier, an adverb modifier, an adjectival phrase modifier, and adverbial phrase modifier. At 606, an advertisement for one or more of the identified low value keywords is placed. In some embodiments, placing the advertisements includes bidding for one or more of the low value keywords. In various embodiments, the advertisement associated with the low value keyword includes a reference that can at least in part be used to display an advertisement associated with the corresponding high value keyword. For example, when an advertisement corresponding to the low value keyword is requested, the reference is used to identify and return an advertisement associated with the corresponding keyword. By placing advertisements at a low value for a potential display of an advertisement of a relatively higher value, keyword arbitrage can be performed. For example, an arbitrage entity can buy a low value keyword associated with a desired semantic meaning of a keyword group for an opportunity to sell an advertisement associated with a higher value keyword of the same semantic keyword group. When the user selects the advertisement associated with the low value keyword, the advertisement associated with the high value keyword is displayed. By paying the advertising fee of the low value keyword, the arbitrage entity can profit from the advertising fee paid by the advertiser of the high value keyword.

Providing in response to a first keyword an advertisement associated with a second keyword having a semantic relationship to the first keyword, and for which a providing entity will receive a higher payment than an advertisement associated directly with the first keyword, is disclosed. FIG. 7 is a flowchart illustrating an embodiment of a process for returning an advertisement. In some embodiments, the process of FIG. 7 is used to perform keyword advertising arbitrage by returning, in response to a query or request including a low value keyword, an advertisement associated with a high value keyword, thereby enabling the entity returning the advertisement to charge the advertising entity the high value rate while paying the displaying/distributing entity at the low value rate. In some embodiments, the process of FIG. 7 is used by a search engine or other entity that displays and/or provides advertisements to maximize its revenue by displaying or providing in response to a low value keyword an advertisement that generates the most revenue for the entity from among the those advertisements likely to be of interest to the user to whom the advertisement is to be displayed. In various embodiments, the process of FIG. 7 is implemented in an entity of distribution network 106, interchange entity 104, and/or an entity of advertiser network 102 in FIG. 1. At 702, one or more keywords are received. Examples of receiving the keywords include receiving keywords of a search query and receiving keywords to return a responsive advertisement by an interchange entity and/or an entity of the advertiser network. At 704, for one or more low value keywords, if any, of the received keywords, an associated relatively high value keyword is identified. The relatively high value keyword is semantically associated with the corresponding low value keyword. In some embodiments, the relatively high value keyword is at least in part identified by identifying a keyword group associated with the corresponding low value keyword. The identified keyword group is used to identify a semantically related keyword of the same group associated with a relatively higher value keyword. In some embodiments, the relatively high value keyword is associated with a parent semantic group of a child semantic group associated with the low value keyword. In some embodiments, the relatively high value keyword is associated with a child semantic group of a parent semantic group associated with the low value keyword. At 706, an advertisement associated with the identified high value keyword is returned. In some embodiments, by returning an advertisement associated with the relatively high value keyword, a relatively higher advertising fee can be obtained from the advertisement than from returning an advertisement associated with the identified low value keyword. In some embodiments, the received keywords are not directly associated with an advertisement, and by replacing one or more of the received keywords with another keyword, a responsive advertisement can be returned.

FIG. 8 is a flowchart illustrating an embodiment of a process for returning an advertisement. At 802, a referral associated with a low value keyword is processed. In some embodiments, the referral is from the advertisement placed in 504 of FIG. 5 and/or in 606 of FIG. 6. In some embodiments, processing the referral includes performing one or more operations associated with a selection received from a user in response to an advertisement. At 804, a relatively high value keyword for the low value keyword is identified. The relatively high value keyword is semantically associated with the corresponding low value keyword. In some embodiments, the relatively high value keyword is at least in part identified by identifying a keyword semantic group associated with the corresponding low value keyword. The identified keyword group is used to identify a semantically related keyword of the same group associated with the relatively higher value keyword. In some embodiments, the relatively high value keyword is associated with a parent semantic group of a child semantic group associated with the low value keyword. In some embodiments, the relatively high value keyword is associated with a child semantic group of a parent semantic group associated with the low value keyword. At 806, an advertisement associated with the identified high value keyword is returned. In some embodiments, by returning an advertisement associated with the relatively high value keyword, keyword advertising arbitrage is performed by profiting the difference between the cost paid by an advertiser for the advertisement associated with the high value keyword and the cost paid to advertise for the referral associated with the low value keyword.

In some embodiments, identifying the relatively high value keyword in 704 of FIG. 7 and/or 804 of FIG. 8 includes replacing one or more low frequency words of the low value keyword with a high frequency word to identify the high value keyword. For example, words with higher common usage frequencies are associated with higher value keywords, and a table identifying common usage frequencies of words is at least in part used to identify synonyms with higher usage frequencies. In some embodiments, identifying the relatively high value keyword in 704 of FIG. 7 and/or 804 of FIG. 8 includes removing one or more words of the low value keyword to identify the high value keyword. For example, a low usage frequency word is removed. In some embodiments, identifying the relatively high value keyword in 704 of FIG. 7 and/or 804 of FIG. 8 includes filtering out stopwords (e.g., articles and vacuous words such as "of", "and", "by", etc.) from the low value keywords to identify the high value keywords. In some embodiments, identifying the relatively high value keyword in 704 of FIG. 7 and/or 804 of FIG. 8 includes using automatically and/or manually generated thesaurus. In some embodiments, identifying the relatively high value keyword in 704 of FIG. 7 and/or 804 of FIG. 8 includes adding a modifier (e.g. an adjective, an adverb or an adjectival or adverbial phrase). In some embodiments, identifying the relatively high value keyword in 704 of FIG. 7 and/or 804 of FIG. 8 includes using location keyword analysis. In one example, location keyword analysis includes zip code and/or area code replacement. In some cases, zip code and area code keywords are associated with lower keyword advertising bid values than city/town name keywords. A zip code and/or area code of a keyword is replaced by a city/town name corresponding to the zip code and/or area code (e.g., from "90210" to "Beverly Hills"). In one example, location keyword analysis includes suburb name replacement. In some cases, suburb name keywords are associated with lower keyword advertising bid values than corresponding city name keywords. A suburb name of a keyword is replaced by a city name associated with the suburb (e.g., from "Burbank" to "Los Angles"). In one example, location keyword analysis includes city modifier removal. In some cases, a location modified city name keywords are associated with lower keyword advertising bid values than corresponding city name keywords without a location modifier. A keyword containing both a city name a location modifier (e.g., "northern", "central", "downtown", "uptown" etc.) is modified to contain only the city name (e.g., from "Downtown Los Angeles" to "Los Angeles").

FIG. 9 is flowchart illustrating an embodiment of a process for returning a relatively high value keyword. In some embodiments, the process of FIG. 9 is included in 704 of FIG. 7. In some embodiments, the process of FIG. 9 is included in 804 of FIG. 8. At 902, a low value keyword is received. In some embodiments, receiving the low value keyword include determining if a keyword is a low value keyword. At 904, a keyword group associated with the received low value keyword is identified. In some embodiments, the keyword content group is associated with the keyword group in 206 of FIG. 2. At 906, a relatively high value keyword of the identified group is returned. In some embodiments, the relatively high value keyword is determined by using a semantic category associated with the group. In some embodiments, a more profitable keyword semantically related with the received low value keyword can be identified by using the identified keyword group.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of performing an operation, comprising:
   receiving at an interchange entity a first keyword indicated from a consumer, wherein the first keyword was received from an advertisement distribution entity;
   using a processor of the interchange entity to determine programmatically for the first keyword an associated semantic group of two or more keywords associated by a semantic relationship;
   sending from the interchange entity to an advertiser entity a second keyword associated with the identified semantic group;
   receiving at the interchange entity from the advertiser entity an advertisement responsive to the second keyword;
   providing from the interchange entity to the advertisement distribution entity the advertisement responsive to the second keyword; and
   using the processor of the interchange entity to account programmatically at least a portion of a non-zero difference between an advertising fee obtained from the advertiser entity for the advertisement responsive to the second keyword and a distribution fee paid to the advertisement distribution entity for helping to generate a generated advertising revenue,
   wherein the advertisement has been served to the consumer, the non-zero difference is associated with the generated advertising revenue, and the distribution fee is associated with the first keyword, and
   wherein the advertisement responsive to the second keyword is provided to the advertisement distribution entity in response to an indication that an advertisement responsive to the first keyword is not available to the advertisement distribution entity.

2. A method as recited in claim 1, wherein the first keyword is associated with a search query.

3. A method as recited in claim 1, wherein the second keyword is associated with a greater advertising bid amount than an advertising bid amount associated with the first keyword.

4. A method as recited in claim 1, wherein the second keyword is associated with the advertising fee payable to the interchange entity and the advertising fee associated with the second keyword is greater than a corresponding second advertising fee associated with the first keyword.

5. A method as recited in claim 1, wherein accounting at least the portion of the non-zero difference includes retaining as profit at least the portion of the non-zero difference when the advertisement fee is greater than the distribution fee.

6. A method as recited in claim 1, wherein the second keyword is derived from the first keyword by one or more of the following: adding a modifier, removing a word in the first keyword, removing a stopword in the first keyword, replacing a zip code in the first keyword with a corresponding city/town name, replacing an area code in the first keyword with a corresponding city/town name, replacing a suburb name in the first keyword with a city name associated with the suburb name, and removing a city name modifier in the first keyword, and using a thesaurus to replace, add, or remove a word.

7. A system for performing an operation, comprising:
   a processor configured to
      receive a first keyword indicated from a consumer,
      identify for the first keyword an associated semantic group of two or more keywords associated by a semantic relationship,
      send to an advertiser entity a second keyword associated with the identified semantic group,
      receive from the advertiser entity an advertisement responsive to the second keyword,
      provide the advertisement to the advertisement distribution entity, and account at least a portion of a non-zero difference between an advertising fee obtained from the advertiser entity for the advertisement responsive to the second keyword and a distribution fee paid to the advertisement distribution entity for helping to generate a generated advertising revenue, wherein the advertisement has been served to the consumer, the non-zero difference is associated with the generated advertising revenue, and the distribution fee is associated with the first keyword, and wherein the advertisement responsive to the second keyword is provided to the advertisement distribution in response to an indication that an advertisement responsive to the first keyword is not available to the advertisement distribution entity; and a memory coupled with the processor and configured to provide the processor with instructions.

8. A system as recited in claim 7, wherein the first keyword is associated with a search query.

9. A system as recited in claim 7, wherein the second keyword is associated with a greater advertising bid amount than an advertising bid amount associated with the first keyword.

10. A system as recited in claim 7, wherein the second keyword is associated with the advertising fee payable to the interchange entity and the advertising fee associated with the second keyword is greater than a corresponding second advertising fee associated with the first keyword.

11. A system as recited in claim 7, wherein accounting at least the portion of the non-zero difference includes retaining as profit at least the portion of the non-zero difference when the advertising fee is greater than the distribution fee.

12. A system as recited in claim 7, wherein the second keyword is derived from the first keyword by one or more of the following: adding a modifier, removing a word in the first keyword, removing a stopword in the first keyword, replacing a zip code in the first keyword with a corresponding city/town name, replacing an area code in the first keyword with a corresponding city/town name, replacing a suburb name in the first keyword with a city name associated with the suburb name, and removing a city name modifier in the first keyword, and using a thesaurus to replace, add, or remove a word.

13. A non-transitory computer readable storage medium embedded with computer instructions which when executed cause a processor to:

receive at an interchange entity a first keyword indicated from a consumer, wherein the first keyword was received from an advertisement distribution entity;

identify for the first keyword an associated semantic group of two or more keywords associated by a semantic relationship;

send from the interchange entity to an advertiser entity a second keyword associated with the identified semantic group;

receive at the interchange entity from the advertiser entity an advertisement responsive to the second keyword;

provide from the interchange entity to the advertisement distribution entity the advertisement responsive to the second keyword;

and account at least a portion of a non-zero difference between an advertising fee obtained from the advertiser entity for the advertisement responsive to the second keyword and a distribution fee paid to the advertisement distribution entity for helping to generate a generated advertising revenue, wherein the advertisement has been served to the consumer, the non-zero difference is associated with the generated advertising revenue, and the distribution fee is associated with the first keyword, and wherein the advertisement responsive to the second keyword is provided to the advertisement distribution entity in response to an indication that an advertisement responsive to the first keyword is not available to the advertisement distribution entity.

14. A non-transitory computer readable storage medium as recited in claim 13, wherein the first keyword is associated with a search query.

15. A non-transitory computer readable storage medium as recited in claim 13, wherein the second keyword is associated with a greater advertising bid amount than an advertising bid amount associated with the first keyword.

16. A non-transitory computer readable storage medium as recited in claim 13, wherein the second keyword is associated with the advertising fee payable to the interchange entity and the advertising fee associated with the second keyword is greater than a corresponding second advertising fee associated with the first keyword.

17. A non-transitory computer readable storage medium as recited in claim 13, wherein accounting at least the portion of the non-zero difference includes retaining as profit at least the portion of the non-zero difference when the advertising fee is greater than the distribution fee.

18. A non-transitory computer readable storage medium as recited in claim 13, wherein the second keyword is derived from the first keyword by one or more of the following: adding a modifier, removing a word in the first keyword, removing a stopword in the first keyword, replacing a zip code in the first keyword with a corresponding city/town name, replacing an area code in the first keyword with a corresponding city/town name, replacing a suburb name in the first keyword with a city name associated with the suburb name, and removing a city name modifier in the first keyword, and using a thesaurus to replace, add, or remove a word.

* * * * *